(12) United States Patent
Honda et al.

(10) Patent No.: US 8,486,549 B2
(45) Date of Patent: Jul. 16, 2013

(54) LITHIUM ION SECONDARY BATTERY

(75) Inventors: Kazuyoshi Honda, Osaka (JP); Toshitada Sato, Osaka (JP); Daisuke Suetsugu, Osaka (JP); Katsumi Kashiwagi, Nara (JP); Kunihiko Bessho, Osaka (JP)

(73) Assignee: Panasonic Corporation, Osaka (JP)

( * ) Notice: Subject to any disclaimer, the term of this patent is extended or adjusted under 35 U.S.C. 154(b) by 637 days.

(21) Appl. No.: 12/600,391

(22) PCT Filed: Jul. 18, 2008

(86) PCT No.: PCT/JP2008/001930
§ 371 (c)(1),
(2), (4) Date: Nov. 16, 2009

(87) PCT Pub. No.: WO2009/011132
PCT Pub. Date: Jan. 22, 2009

(65) Prior Publication Data
US 2010/0167112 A1 Jul. 1, 2010

(30) Foreign Application Priority Data
Jul. 19, 2007 (JP) ................................. 2007-188176

(51) Int. Cl.
*H01M 6/10* (2006.01)
*H01M 4/58* (2010.01)

(52) U.S. Cl.
USPC ....................................... 429/94; 429/231.95

(58) Field of Classification Search
USPC .............................. 429/94, 231.95
See application file for complete search history.

(56) References Cited

U.S. PATENT DOCUMENTS

| 2003/0039890 A1 | 2/2003 | Yun et al. | |
| 2005/0079421 A1 | 4/2005 | Konishiike et al. | |
| 2006/0286439 A1 * | 12/2006 | Fujikawa et al. | 429/62 |
| 2009/0029252 A1 * | 1/2009 | Nakai et al. | 429/218.1 |

FOREIGN PATENT DOCUMENTS

| EP | 1 562 250 A2 | 8/2005 |
| JP | 09-283179 | 10/1997 |

(Continued)

OTHER PUBLICATIONS

European Search Report issued in application No. 08790232.6 issued on Apr. 10, 2012.

*Primary Examiner* — Karie O'Neill Apicella
(74) *Attorney, Agent, or Firm* — McDermott Will & Emery LLP

(57) ABSTRACT

A lithium ion secondary battery including: a positive electrode current collector; a positive electrode active material layer that is provided in contact with the positive electrode current collector; a separator layer that is provided on a side of the positive electrode active material layer on which the positive electrode current collector is not provided; a negative electrode active material layer that is provided on a side of the separator layer on which the positive electrode active material layer is not provided, that primarily contains silicon or tin, and that includes a opposing portion opposing the positive electrode active material layer and a non-opposing portion not opposing the positive electrode active material layer, the opposing portion and the non-opposing portion containing lithium produced by a thin film-forming method; and a negative electrode current collector that is provided on a side of the negative electrode active material layer on which the separator layer is not provided. Thereby, deformation of the negative electrode and deterioration in cycle characteristics accompanied by such deformation can be prevented.

8 Claims, 5 Drawing Sheets

| | FOREIGN PATENT DOCUMENTS | |
|---|---|---|
| JP | 10-239708 | 9/1998 |
| JP | 2000-133308 | 5/2000 |
| JP | 2002-356314 | 12/2002 |
| JP | 2003-068283 | 3/2003 |
| JP | 2003-162997 | 6/2003 |
| JP | 2004-127561 | 4/2004 |
| JP | 2005-038720 | 2/2005 |
| JP | 2005-085632 | 3/2005 |
| JP | 2006-139986 | 6/2006 |
| JP | 2007-122992 A | 5/2007 |
| JP | 2007-165226 | 6/2007 |
| WO | WO 01/31722 A1 | 5/2001 |

\* cited by examiner

LITHIUM ION SECONDARY BATTERY

RELATED APPLICATIONS

This application is the U.S. National Phase under 35 U.S.C. §371 of International Application No. PCT/JP2008/001930, filed on Jul. 18, 2008, which in turn claims the benefit of Japanese Application No. 2007-188176, filed on Jul. 19, 2007, the disclosures of which Applications are incorporated by reference herein.

TECHNICAL FIELD

The present invention relates to a lithium ion secondary battery. More particularly, the present invention primarily relates to an improvement in the negative electrode.

BACKGROUND ART

Lithium ion secondary batteries are being widely used as a power source for portable compact electronic devices such as, for example, cell phones, personal digital assistants (PDAs), notebook computers and camcorders, since they have a high capacity and a high energy density and facilitate miniaturization and weight reduction. With the recent trend toward increasing the functionality of portable compact electronic devices, demand is also growing for higher capacity in lithium ion secondary batteries.

Various methods have been proposed to achieve higher capacity in lithium ion secondary batteries. Among them, attention is focused on an alloy-based negative electrode active material. The alloy-based negative electrode active material is a material capable of absorbing lithium by being alloyed with lithium and reversibly absorbing and desorbing lithium. As the alloy-based negative electrode active material, for example, silicon, silicon-containing compounds, tin, tin-containing compounds and the like are known. Because the alloy-based negative electrode active material has a high discharge capacity, the use of such a negative electrode active material is effective in achieving higher capacity in lithium ion secondary batteries. Silicon, for example, has a theoretical discharge capacity of about 4199 mAh/g, which is about 11 times the theoretical discharge capacity of graphite.

However, an alloy-based negative electrode active material expands because the crystal structure changes significantly when absorbing lithium ions, causing not only the current collector but also the negative electrode to deform. Along with this deformation, cracking of the negative electrode active material particles, separation of the negative electrode active material layer from the current collector, and the like occur. As a result, the electron conductivity between the current collector and the negative electrode active material layer decreases, leading to the deterioration of battery characteristics such as cycle characteristics. In order to solve such problems, a proposal has been made in which a space for allowing such expansion when absorbing lithium ions to occur is provided in advance in such an alloy-based negative electrode active material layer.

Specifically, a negative electrode for a lithium secondary battery has been proposed in which, for example, a thin-film negative electrode active material layer made of an alloy-based negative electrode active material or an alloy containing an alloy-based negative electrode active material is formed in a prescribed pattern on a current collector made of a material that does not alloy with lithium (see, for example, Patent Document 1). According to Patent Document 1, such a thin-film negative electrode active material layer is composed of a plurality of columns, and the columns are arranged in a staggered arrangement, a grid arrangement or the like with a gap between adjacent columns. And, by causing the gap between columns to absorb the volume expansion of the alloy-based negative electrode active material contained in the columns, deformation of the negative electrode current collector, as well as cracking of the alloy-based negative electrode active material, separation of the columns from the current collector, and the like that occur along with such deformation are prevented.

Another negative electrode for a lithium ion secondary battery has also been proposed which includes a current collector having a surface roughness Ra of 0.01 μm or more, and a thin-film negative electrode active material layer formed on the surface of the current collector and containing an alloy-based negative electrode active material (see for example, Patent Document 2). By providing a negative electrode of the above configuration, Patent Document 2 attempts to increase the contact area of the interface between the current collector and the thin-film negative electrode active material layer and improve adhesion between the current collector and the thin-film negative electrode active material layer.

Furthermore, when the negative electrode of Patent Document 2 is included in a lithium ion secondary battery, and the battery is subjected to an initial charge and discharge, because the current collector having the above-mentioned surface roughness is used, cracks are formed in the thin-film negative electrode active material layer, and the thin-film negative electrode active material layer is divided into a plurality of columns which exist apart from each other with a gap therebetween. Because the gap absorbs the expansion of the alloy-based negative electrode active material, separation of the thin-film negative electrode active material layer and the like are further prevented.

Attempts have also been made to reduce the expansion and contraction of the alloy-based negative electrode active material. For example, a proposal is disclosed in which a partially nitrided silicon oxide powder represented by a composition formula: $SiN_xO_y$ (where, $0<x<1.3$, $0<y<1.5$) is used as a negative electrode active material for a lithium ion secondary battery (see, for example, Patent Document 3). By introducing nitrogen into silicon oxide, the degree of expansion and contraction is reliably reduced although the discharge capacity decreases slightly. In an example of Patent Document 3, a negative electrode is produced in which a negative electrode active material layer containing the partially nitrided silicon oxide powder is formed on the current collector surface.

A technique has also been proposed in which lithium foil is firmly attached to the surface of the negative electrode active material layer of a negative electrode with an auxiliary layer containing water-insoluble conductive particles interposed therebetween (see for example, Patent Document 4). The lithium in the lithium foil firmly attached to the negative electrode active material layer starts to disperse into the negative electrode active material layer at the point in time when an electrolyte is injected, and disperses throughout the negative electrode active material layer during the initial charge and discharge. Patent Document 4 also discloses a negative electrode active material layer configured to have a opposing portion opposing a positive electrode and a non-opposing portion not opposing the positive electrode, wherein the amount of lithium per unit area firmly attached to the non-opposing portion is increased relative to the amount of lithium per unit area firmly attached to the opposing portion.

Conventionally, a method is used in which a lithium film is formed on the surface of a negative electrode active material layer by a vapor deposition method, such as a vacuum deposition method or ion plating method, so as to cause the negative electrode active material layer to absorb lithium that does not take part in charge and discharge reactions in an amount equivalent to its irreversible capacity. Another method is also known in which a lithium film is formed, by a vapor deposition method, on the surface of a negative electrode active material layer formed by a vapor deposition method (see for example, Patent Document 5, paragraph 0037; and Patent Document 6). However, according to the conventional methods, the lithium film is formed only in the opposing portion of the negative electrode active material layer, and not on the non-opposing portion. Patent Documents 5 and 6 do not disclose forming a lithium film on the non-opposing portion.

Patent Document 1: Japanese Laid-Open Patent Publication No. 2004-127561
Patent Document 2: WO 01/031722 Pamphlet
Patent Document 3: Japanese Laid-Open Patent Publication No. 2002-356314
Patent Document 4: Japanese Laid-Open Patent Publication No. Hei 9-283179
Patent Document 5: Japanese Laid-Open Patent Publication No. 2005-85632
Patent Document 6: Japanese Laid-Open Patent Publication No. 2005-38720

DISCLOSURE OF THE INVENTION

Problem to be Solved by the Invention

The present inventors conducted in-depth studies to maintain the cycle characteristics of a lithium ion secondary battery including a negative electrode active material primarily containing silicon or tin at a high level for a long period of time. Specifically, they conducted studies to suppress expansion and contraction of the alloy-based negative electrode active material during charge and discharge and prevent deformation of the negative electrode. In the course of their studies, they noticed one of the basic structures of the battery.

Ordinarily, in a lithium ion secondary battery having a configuration in which a positive electrode, a separator and a negative electrode are arranged in this order, and a positive electrode active material layer of the positive electrode and a negative electrode active material layer of the negative electrode are arranged so as to oppose each other with the separator interposed therebetween, and the negative electrode is designed to be slightly larger than the positive electrode. This is to reduce variation in the opposing area between the positive and negative electrodes, as well as to prevent lithium from depositing on a portion other than the negative electrode active material layer. Accordingly, in the negative electrode active material layer, a opposing portion opposing the positive electrode active material layer and a non-opposing portion not opposing the positive electrode active material layer exist together with the separator therebetween. The present inventors noticed this point and pursued further studies.

The opposing portion and the non-opposing portion have completely different functions in the lithium ion secondary battery. It is known that the absorption and desorption reactions of lithium take place only in the opposing portion where the negative electrode active material layer and the positive electrode active material layer oppose each other. The opposing portion absorbs lithium and expands during charge, and releases lithium and contracts during discharge, and therefore its volume changes significantly due to absorption and desorption of lithium.

On the other hand, the non-opposing portion is provided for the above-described purpose, and it hardly takes part in the absorption and desorption reactions of lithium, so a change in volume due to expansion and contraction does not occur. Consequently, the difference in volume change between the opposing portion and the non-opposing portion becomes large particularly during charge, creating a step, the height of which corresponds to the expansion amount of the opposing portion, in the boundary between the opposing portion and the non-opposing portion on the surface of the negative electrode active material layer.

Also, a negative electrode active material primarily containing silicon or tin has a relatively large irreversible capacity. In a lithium ion secondary battery, lithium is absorbed into the negative electrode active material layer during charge. The lithium is desorbed from the negative electrode active material layer, but part of the lithium remains in the negative electrode active material layer, without contributing to discharge. The amount of lithium that remains in the negative electrode active material layer is referred to as its irreversible capacity. When the irreversible capacity is large, charge/discharge efficiency as well as battery capacity are reduced significantly. For this reason, lithium is added in advance to the negative electrode active material layer containing an alloy-based negative electrode active material in an amount equivalent to the irreversible capacity of the negative electrode active material layer.

However, the non-opposing portion does not take part in the absorption and desorption reactions of lithium as described above, so generally, lithium in an amount equivalent to the irreversible capacity is added only to the opposing portion. Accordingly, in conventional lithium ion secondary batteries, lithium is not included in the non-opposing portion not opposing the positive electrode active material layer of the negative electrode active material layer, except for the case in which a trace amount of lithium exists in the boundary portion between the opposing portion and the non-opposing portion. This was already discussed above with reference to Patent Documents 5 and 6.

According to the studies conducted by the present inventors, the opposing portion expands even when lithium in an amount equivalent to the irreversible capacity is added, and its thickness increases by approximately 20%, for example. In this case as well, a step is created in the boundary between the opposing portion and the non-opposing portion on the surface of the negative electrode active material layer due to the volume change of the opposing portion. Also, the volume change during charge of the opposing portion to which lithium has been added in advance becomes even larger than that of the opposing portion to which no lithium has been added, so the step created in the boundary with the non-opposing portion whose volume hardly changes becomes even larger.

As described above, in conventional negative electrodes, a step is inevitably created in the boundary between the opposing portion and the non-opposing portion on the surface of the negative electrode active material layer due to the volume expansion of the opposing portion. This is considered to be the primary factor that causes the current collector to deform. The techniques disclosed in Patent Documents 1 to 6, however, do not at all consider the difference in volume change between the opposing portion and the non-opposing portion, and merely attempt to absorb or reduce the expansion of the negative electrode active material layer during charge. Therefore, according to the techniques of Patent Documents 1 to 3, it is not possible to sufficiently prevent cracking of the negative electrode active material, separation of the negative electrode active material layer from the current collector, and the like; thus, the degradation of cycle characteristics over a period of long-term use is unavoidable.

Patent Document 4 discloses a configuration in which the amount of lithium in the non-opposing portion is increased relative to that in the opposing portion when lithium foil is firmly attached to the surface of the negative electrode active material layer. However, the purpose of Patent Document 4 employing such a configuration is to level the potential of the positive electrode, rather than to suppress expansion and contraction of the negative electrode active material layer.

Also, according to Patent Document 4, lithium is inserted into the negative electrode active material layer from the lithium foil during the initial charge performed after assembly of the battery. However, because the charge reaction takes place primarily between the opposing portion of the negative electrode active material layer and the positive electrode, the non-opposing portion hardly takes part in the charge reaction. Accordingly, a situation can occur in which lithium is not inserted into the non-opposing portion adjacent to the opposing portion.

Furthermore, with the battery of Patent Document 4, as described above, the insertion of lithium into the negative electrode active material layer starts at the point in time when an electrolyte is injected into the battery. In this case, the amount of lithium inserted is affected by the battery's internal temperature, the exposure time of the battery to electrolyte, and the like. However, a sufficient amount of lithium would never be inserted using the exposure time of the battery to electrolyte and the internal battery temperatures employed in ordinary battery assembly.

The insertion of lithium into the negative electrode active material layer is also affected by the degree of adhesion of the lithium foil to the negative electrode active material layer. Because the opposing portion of the negative electrode active material layer overlaps the separator and the positive electrode, the force with which the lithium foil is pressed against the opposing portion is relatively large. On the other hand, the non-opposing portion is in contact only with the separator, and because the separator has flexibility, the force with which the lithium foil is pressed against the non-opposing portion is obviously smaller than the force against the opposing portion. Since the non-opposing portion does not take part in the charge and discharge reactions, and the pressing force of the lithium foil against the non-opposing portion is weak, it is very difficult to insert lithium into the non-opposing portion of the negative electrode active material layer during charge performed after assembly of the battery.

It is an object of the present invention to provide a lithium ion secondary battery including a negative electrode that, although containing silicon or tin as a primary component of a negative electrode active material, is capable of preventing the degradation of battery characteristics, such as the cycle characteristics, that occurs along with deformation of the current collector.

Means for Solving the Problem

As a result of the present inventors' in-depth studies to solve the above-described problems, they found that, in conventional negative electrodes, in addition to the difference in volume change between the opposing portion and the non-opposing portion during charge and discharge, a difference in volume change occurs even when lithium is added in advance as a measure against irreversible capacity. It is presumed that, due to multiple factors that cause the difference in volume change between the opposing portion and the non-opposing portion, a step is created in the boundary between the opposing portion and the non-opposing portion as well as in the vicinity of the boundary on the surface of the negative electrode active material layer, causing the current collector to become significantly distorted and more likely to deform easily. As a result of further study on the basis of this finding, the present inventors successfully obtained a negative electrode for a lithium secondary battery that fulfills the above purposes; thus, the present invention has been achieved.

Specifically, the present invention relates to a lithium ion secondary battery including:

a positive electrode current collector;

a positive electrode active material layer that is provided in contact with the positive electrode current collector;

a separator layer that is provided on a side of the positive electrode active material layer on which the positive electrode current collector is not provided;

a negative electrode active material layer that is provided on a side of the separator layer on which the positive electrode active material layer is not provided, that primarily contains silicon or tin, and that includes a opposing portion opposing the positive electrode active material layer and a non-opposing portion not opposing the positive electrode active material layer, the opposing portion and the non-opposing portion containing lithium produced by a thin film-forming method; and a negative electrode current collector that is provided on a side of the negative electrode active material layer on which the separator layer is not provided.

It is preferable that the lithium is inserted into the opposing portion and the non-opposing portion by forming a lithium film on the surfaces of the opposing portion and the non-opposing portion by a vacuum process before the battery is assembled.

It is preferable that the negative electrode active material layer is formed by a vacuum process.

According to an embodiment of the present invention, it is preferable that the amount of lithium contained in the non-opposing portion is larger than the amount of lithium contained in the opposing portion.

According to another embodiment of the present invention, it is preferable that the amount of lithium contained in the non-opposing portion and the amount of lithium contained in the opposing portion are the same or almost the same.

It is preferable that the positive electrode current collector, the positive electrode active material layer, the separator layer, the negative electrode active material layer, and the negative electrode current collector are spirally wound to form a spirally wound electrode, or the positive electrode current collector, the positive electrode active material layer, the separator layer, the negative electrode active material layer, and the negative electrode current collector are laminated to form a stacked electrode.

Effect of the Invention

The lithium formed on the active material by a thin film-forming method diffuses into the active material layer after the thin film is formed and before an electrolyte is injected. That is, it is possible to cause the lithium to diffuse into the negative electrode active material and expand the active material layer before the battery is assembled.

In the present invention, by forming lithium on the opposing portion opposing the positive electrode and the non-opposing portion of the negative electrode active material layer by a thin film-forming method, it is possible to cause the active material layer, that is, both the opposing portion and the non-opposing portion, to expand before the battery is assembled. When a lithium foil is attached to the opposing portion and the non-opposing portion of the active material layer as in conventional methods, the diffusion of lithium into the non-opposing portion is insufficient. Also, because lithium diffuses into the active material layer after assembly of the battery, uniform expansion of the opposing portion of the active material restrained by a separator and the like and the non-opposing portion is inhibited.

Although the negative electrode for a lithium ion secondary battery used in the present invention contains an alloy-based negative electrode active material, deformation of the current collector accompanied by the absorption and desorption of lithium is very small. For this reason, it is possible to maintain its high discharge capacity for a long period of time. Accordingly, the lithium ion secondary battery of the present invention that includes such a negative electrode for a lithium ion secondary battery has a capacity higher than conventional batteries, and its battery characteristics, such as cycle characteristics, are also maintained in a favorable range for a long period of time.

BEST MODE FOR CARRYING OUT THE INVENTION

Figure 1A:
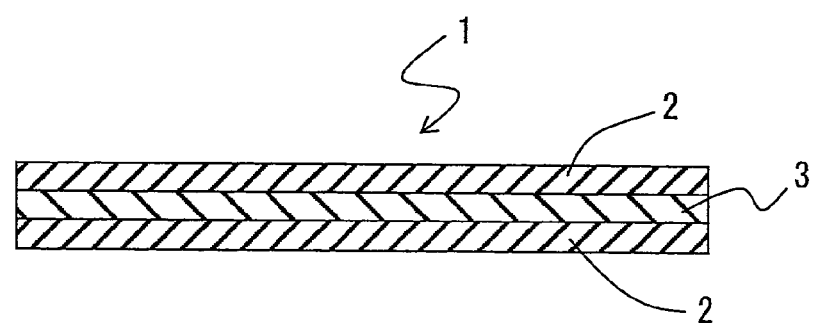
FIG. 1A is a vertical cross-sectional view schematically illustrating the configuration of a negative electrode 1 for a lithium ion secondary battery according to Embodiment 1 of the present invention.
Figure 1B:
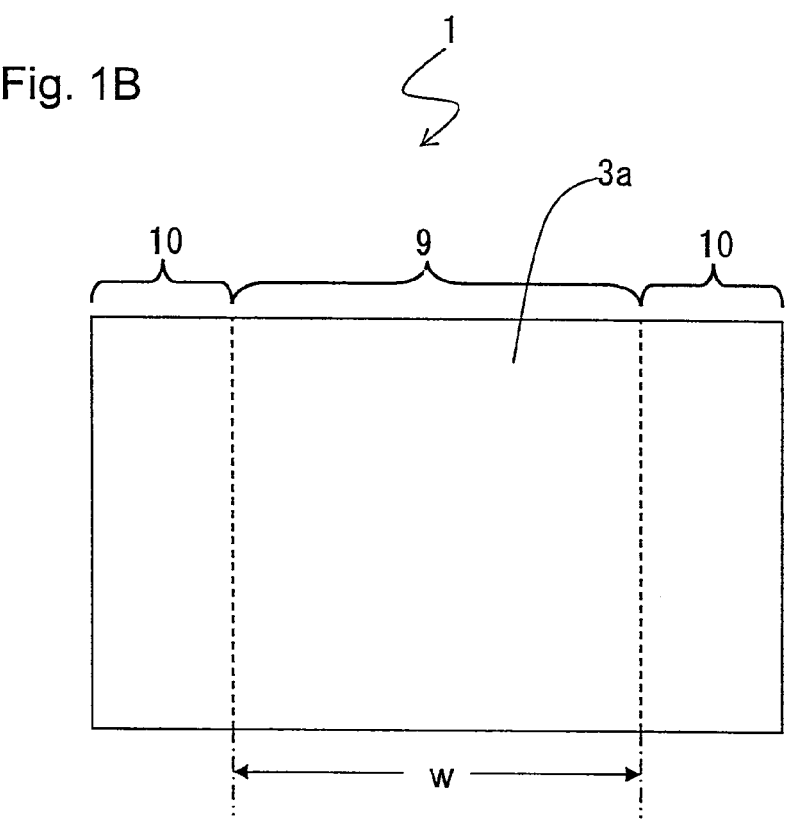
FIG. 1B is a top view schematically illustrating the configuration of the negative electrode 1 for a lithium ion secondary battery according to Embodiment 1 of the present invention.
Figure 2:
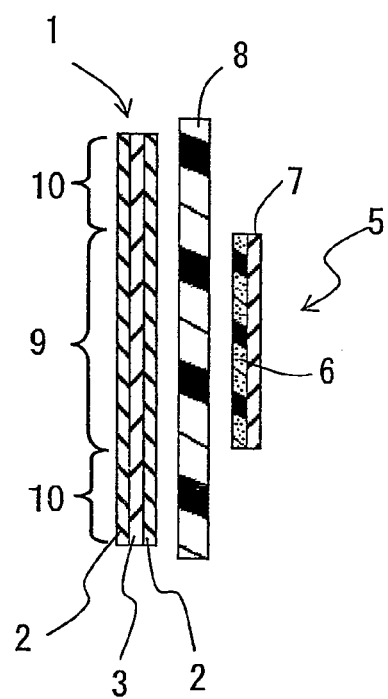
FIG. 2 is a horizontal cross-sectional view schematically illustrating the configuration of an electrode group including the negative electrode shown in FIG. 1.

FIG. 1 is a diagram schematically illustrating the configuration of a negative electrode 1 (hereinafter, unless otherwise stated, referred to simply as "negative electrode 1") included in a lithium ion secondary battery according to an embodiment of the present invention. FIG. 1A shows a vertical cross-sectional view, and FIG. 1B shows a top view. FIG. 2 is a cross-sectional view schematically illustrating the configuration of an electrode group 4 including the negative electrode 1 shown in FIG. 1. FIG. 2 is a horizontal cross-sectional view when the electrode group 4 is placed with its longitudinal direction matching the vertical direction.

The negative electrode 1 includes a negative electrode active material layer 2 and a negative electrode current collector 3. When configuring an electrode group 4 to be included in a lithium ion secondary battery (not shown), the negative electrode active material layer 2 is provided on a side of a separator 8 on which a positive electrode current collector 7 of a positive electrode active material layer 6 is not provided, include a opposing portion 9 opposing the positive electrode active material layer 6 and a non-opposing portion 10 not opposing the positive electrode active material layer 6, and contains a negative electrode active material primarily containing silicon or tin. The negative electrode 1 is disposed as shown in FIG. 2 such that the negative electrode active material layer 2 and the positive electrode active material layer 6 of a positive electrode 5 oppose each other with the separator 8 interposed therebetween. In FIG. 2, the negative electrode 1 and the separator 8 as well as the positive electrode 5 and the separator 8 are shown spaced apart from each other, but they may be disposed in contact with each other.

The negative electrode active material layer 2 is formed so as to have a horizontal width larger than that of the positive electrode 5. The purpose of this is to reduce variation of the opposing area between the positive electrode active material layer 6 and the negative electrode active material layer 2 and prevent lithium from depositing on a portion other than the negative electrode active material layer 2. Accordingly, the negative electrode 1 includes the opposing portion 9 and the non-opposing portion 10 in the negative electrode active material layer 2. The opposing portion 9 is a portion that opposes the positive electrode active material layer 6 and takes part in the absorption and desorption of lithium. The width w of the opposing portion 9 is almost the same as the width of the positive electrode active material layer 6. The non-opposing portion 10 is a portion that hardly takes part in the absorption and desorption of lithium because it is not opposing the positive electrode active material layer 6.

In the present embodiment, the negative electrode active material layer 2 is formed to have a width equal to that of the negative electrode current collector 3, but the negative electrode active material layer 2 may have a width smaller than that of the negative electrode current collector 3 as long as the width of the negative electrode active material layer 2 is larger than that of the positive electrode 5. Accordingly, the negative electrode current collector 3 may include, on its surface, a portion where the negative electrode active material layer 2 is not formed.

In the negative electrode 1, the non-opposing portion 10 of the negative electrode active material layer 2 contains lithium produced by a thin film-forming method. The lithium produced by a thin film-forming method is lithium that is inert in charge and discharge reactions, that is, lithium that does not take part in charge and discharge reactions. The lithium produced by a thin film-forming method is not used in discharge. The inclusion of such lithium produced by a thin film-forming method means that lithium is included even in a discharged state. In the present invention, the term "discharged state" refers to a state in which the lithium that takes part in charge and discharge reactions (hereinafter referred to simply as "active lithium") is not stored in the opposing portion 9 in a preset range ranging from a discharge start voltage to a discharge end voltage.

The discharged state also encompasses a state in which only lithium that is not used in discharge is added to both the opposing portion 9 and the non-opposing portion 10.

Accordingly, in the present invention, a specific example of the state in which the non-opposing portion 10 in a discharged state includes the lithium produced by a thin film-forming method includes, for example, a state in which only lithium is added to the opposing portion 9, and almost the same amount as that added to the opposing portion 9 or more of lithium is added to the non-opposing portion 10.

When measures against irreversible capacity are taken in which lithium produced by a thin film-forming method is added to the opposing portion 9, by adding the lithium produced by a thin film-forming method not only to the opposing portion 9 but also to the non-opposing portion 10, both the opposing portion 9 and the non-opposing portion 10 expand. Accordingly, when such measures against irreversible capacity are taken, a very small step or no step is created in the boundary between the opposing portion 9 and the non-opposing portion 10. For example, when almost the same amount of lithium is added to the opposing portion 9 and the non-opposing portion 10, no step is created.

When lithium produced by a thin film-forming method is added to the opposing portion 9 in an amount equivalent to the irreversible capacity, and a smaller amount of lithium produced by a thin film-forming method is applied to the non-opposing portion 9, the step becomes smaller as compared to the case in which lithium in an amount equivalent to the irreversible capacity is applied only to the opposing portion 9. As described above, according to the present invention, by taking measures against irreversible capacity, only a small step or no step is created. Accordingly, even when a step is created as a result of the volume expansion of the opposing portion 9 in a charged state, the sum total of the step created after taking measures against irreversible capacity and the step created in a charged state becomes smaller as compared to that of conventional negative electrodes. As a result, distortion that occurs in the negative electrode current collector 3 in the boundary between the opposing portion 9 and the non-opposing portion 10 as well as in the vicinity thereof is mitigated.

Mitigating the distortion of the negative electrode current collector 3 is very important. Generally, assembling a battery involves the processes of cutting a negative electrode 1, a positive electrode 5 and a separator 8 to their designed sizes, disposing them such that the negative electrode 1 and the positive electrode 5 oppose each other with the separator 8 interposed therebetween, and spirally winding or laminating them. If a distortion occurs in the negative electrode current collector 3 at the boundary between the opposing portion 9 and the non-opposing portion 10 during the above processes, a possibility arises that not only the negative electrode current collector 3 but also the negative electrode 1 may deform.

From the viewpoint of preventing such deformation, it is desirable that the amount of distortion that occurs in the negative electrode current collector 3 at a portion adjacent to the boundary between the opposing portion 9 and the non-opposing portion 10 is reduced. In the present invention, the distortion that occurs in the negative electrode current collector 3 is successfully mitigated by adding lithium also to the non-opposing portion 10 by a thin film-forming method as described above. As a result, not only deformation of the negative electrode current collector 3, but also deformation of the negative electrode 1 is reduced, preventing cracking of the negative electrode active material, separation of the negative electrode active material layer 2 from the negative electrode current collector 3, and the like; thus, the cycle characteristics and the like of the battery can be improved.

In contrast thereto, when measures against irreversible capacity are taken in a conventional lithium ion secondary battery in which lithium is not added in advance to the non-opposing portion 10 by a thin film-forming method, a relatively large step is created in the boundary between the opposing portion 9 and the non-opposing portion 10. When charging is performed in this state, the opposing portion 9 absorbs lithium and expands, whereas the non-opposing portion 10 hardly expands. Consequently, a step is created in the boundary between the opposing portion 9 and the non-opposing portion 10 as a result of the volume expansion of the opposing portion 9.

In the case of using a negative electrode active material primarily containing silicon, for example, the volume after absorbing lithium to the maximum is 4.4 times the volume before absorbing lithium. Because the negative electrode active material primarily containing silicon or tin has a high rate of volume change, the step created during charging also becomes relatively large. The step created after measures against irreversible capacity are taken, when combined with the step created during charge, becomes large enough to cause a large distortion in the current collector. When a large distortion occurs in the current collector, it causes the current collector as well as the negative electrode to deform.

The amount of lithium produced by a thin film-forming method that is added to the non-opposing portion 10 can be selected as appropriate from a wide range according to various conditions, but it is preferable to select from a range ranging from an amount equivalent to the irreversible capacity or more to an amount equal to the full charge or less. As used herein, the various conditions include, for example, the relationship between the rate of volume change and the absorbed amount of lithium of the opposing portion 9, the mechanical strength of the negative electrode current collector 3, etc.

Although depending on the electrode production method, it is preferable to add the same amount of lithium per unit area to both the opposing portion 9 and the non-opposing portion 10 in terms of the ease of production. Furthermore, in order to reduce the size of the step created in the boundary between the opposing portion 9 and the non-opposing portion 10, it is more preferable that the amount of lithium per unit area added to the non-opposing portion 10 is larger than the amount of lithium per unit area added to the opposing portion 9.

A specific example of this configuration includes, for example, a configuration in which the amount of lithium added to the opposing portion 9 by a thin film-forming method is set to an amount equivalent to the irreversible capacity, and the amount of lithium added to the non-opposing portion 10 by a thin film-forming method is selected from a range ranging from greater than the amount equivalent to the irreversible capacity amount to less than the amount equal to the full charge. With this configuration, the absolute value of the amount of distortion that occurs in the negative electrode current collector 3 in the vicinity of the boundary between the opposing portion 9 and the non-opposing portion 10 can be reduced, and deformation of the negative electrode current collector 3 can be further reduced.

It is more preferable that lithium is added to the non-opposing portion 10 by a thin film-forming method in an amount that can cause the non-opposing portion 10 to undergo a volume change half the volume change of the opposing portion 9 when expanded at the maximum. With this configuration, the absolute value of the amount of distortion that occurs in the negative electrode current collector 3 can be minimized.

According to another preferred embodiment of the present invention, the amount of lithium per unit area added to the non-opposing portion 10 by a thin film-forming method is almost the same as the amount of lithium per unit area added to the opposing portion 9 by a thin film-forming method. A specific example of this configuration includes, for example, a configuration in which an amount of lithium equivalent to the irreversible capacity is added to the opposing portion 9 and the non-opposing portion 10 by a thin film-forming method. With this configuration, it becomes possible to cause the opposing portion 9 of the negative electrode active material layer 2 to absorb almost all lithium contained in the positive electrode active material layer 6, while mitigating the distortion that occurs in the negative electrode current collector 3, and as a result, a higher capacity can be achieved.

Furthermore, as a result of further study of the present inventors, it has been found that when a negative electrode active material primarily containing silicon is used, for example, by simply adding an amount of lithium equivalent to the irreversible capacity by a thin film-forming method, the opposing portion 9 and the non-opposing portion 10 expand at almost the same rate. Although the cause of this is not clearly known, it is presumed that there is a correlation with the coating formed on the surface of the negative electrode active material.

Lithium is not necessarily added to the whole non-opposing portion 10. That is, as long as the effect of mitigating the distortion of the negative electrode current collector 3 can be exhibited, the non-opposing portion 10 may include a portion where lithium is not added, depending on the battery design and the manufacturing process. In addition, even when lithium is added only to the vicinity of the boundary between the non-opposing portion 10 and the opposing portion 9, a rapid volume change in the vicinity of the boundary can be reduced, so a certain level of effect of the present invention is exhibited. Of course, lithium may be added to the whole non-opposing portion 10.

The negative electrode active material layer 2 is provided on the side of the separator 8 on which the positive electrode active material layer 6 is not provided. More specifically, the negative electrode active material layer 2 is formed on both surfaces in the thickness direction of the negative electrode current collector 3, and contains a negative electrode active material primarily containing lithium and silicon or tin. In the present embodiment, the negative electrode active material layer 2 is formed on both surfaces of the negative electrode current collector 3, but the configuration is not limited thereto, and the negative electrode active material layer 2 may be formed on only one surface of the negative electrode current collector 3.

There is no particular limitation on the negative electrode active material primarily containing silicon as long as it is capable of electrochemically reacting with lithium and, for example, silicon, a silicon compound or the like can be used. Examples of silicon compounds include silicon-containing alloy, silicon oxide, silicon nitride, etc. Likewise, there is no particular limitation on the negative electrode active material primarily containing tin as long as it is capable of electrochemically reacting with lithium and, for example, tin, a tin compound or the like can be used. Examples of such a tin compound include tin-containing alloy, tin oxide, tin nitride, etc. Such a negative electrode active material primarily containing silicon or tin has a relatively high reactivity with lithium, and therefore a high capacity can be expected. As the negative electrode active material primarily containing silicon or tin, the above materials can be used alone or in a combination of two or more as appropriate.

From the viewpoint of the reactivity with lithium, it is preferable that the negative electrode active material primarily containing silicon or tin is amorphous or has low crystallinity. As used herein, the term "low crystallinity" refers to a state in which the crystal grains have a grain size of 50 nm or less. The grain size of crystal grains is calculated according to the Scherrer equation from the half-value width of a peak having the highest intensity in a diffraction image obtained by X-ray diffractometry. The term "amorphous" refers to the state of having a broad peak in a range of $2\theta=15$ to $40°$ in a diffraction image obtained by X-ray diffractometry.

The thickness of the negative electrode active material layer 2 can be selected as appropriate according to the performance set for the battery to be produced, but the thickness is preferably 3 to 40 µm. When the negative electrode active material layer 2 has a thickness of less than 3 µm, the proportion of the negative electrode active material in the whole battery becomes small, and the energy density of the battery may decrease. Conversely, when the negative electrode active material layer 2 has a thickness exceeding 40 µm, the stress at the interface between the negative electrode current collector 3 and the negative electrode active material layer 2 increases, making it more likely to cause deformation in the negative electrode current collector 3, and the like, even when the configuration of the present invention is applied.

The negative electrode current collector 3 is provided on the side of a negative electrode active material layer 2 on which the separator 8 is not provided. As the negative electrode current collector 3, any negative electrode current collector widely used in the field of lithium ion secondary batteries can be used and, for example, a porous or poreless conductive substrate made of a metal material such as copper, nickel or stainless steel can be used. Examples of porous conductive substrates include mesh, net, punched sheet, lath structures, porous sheet, foam, articles made of fibers (nonwoven fabric, etc.), etc. Examples of poreless conductive substrates include foil, sheet, film, etc. The thickness of the conductive substrate is preferably 10 to 50 µm, and more preferably 15 to 40 µm considering mechanical strength, volume efficiency as a battery, the ease of handling, and so on. It is also possible to provide a plurality of protrusions on the surface of the negative electrode current collector 3. With this configuration, the strength of adhesion between the negative electrode current collector 3 and the negative electrode active material layer 2 can be improved. The substrate portion and the protrusion portion may be made of the same material or may be made of different materials. The protrusions can be formed by, for example, plating, etching or the like.

The negative electrode 1 can be manufactured by, for example, a manufacturing method involving a thin film-forming step and a lithium adding step.

In the thin film-forming step, a thin film containing a negative electrode active material primarily containing silicon or tin is formed on the surface of the negative electrode current collector 3 by a thin film-forming method. The thin film-forming method is performed by, for example, a vacuum process. The vacuum process can be, for example, a generally used vapor deposition thin film-forming method such as a vapor deposition method, a sputtering method and a CVD method (chemical vapor deposition method). It is preferable to use a vapor deposition method in particular. More specifically, the thin film can be formed on the surface of the negative electrode current collector 3 by, for example, using a film-forming apparatus 11 shown in FIG. 3.

Figure 3:
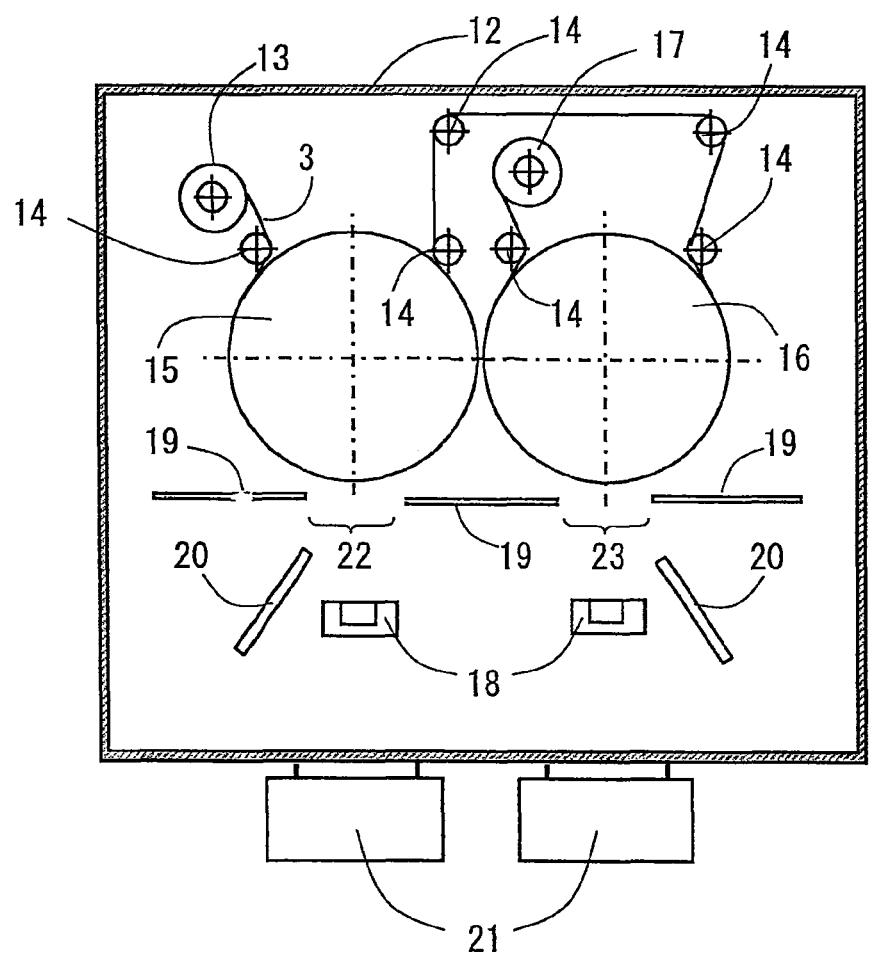
FIG. 3 is a vertical cross-sectional view schematically illustrating the configuration of a relevant part of a film-forming apparatus.

FIG. 3 is a vertical cross-section view schematically illustrating the configuration of a relevant part of the film-forming apparatus 11. The film-forming apparatus 11 includes a vacuum chamber 12, a feeding roller 13, transfer rollers 14, a first can roller 15, a second can roller 16, a winding roller 17, an active material adding means 18, shielding plates 19, raw material gas-introducing pipes 20 and air exhaust means 21. The film-forming apparatus 11 is an apparatus for producing a laminate in which thin films are formed on both surfaces in the thickness direction of the negative electrode current collector 3.

The vacuum chamber 12 is a pressure-resistant vessel member having an internal space, and includes, in the internal space, the feeding roller 13, the transfer rollers 14, the first can roller 15, the second can roller 16, the winding roller 17, the active material adding means 18, the shielding plates 19 and the raw material gas-introducing pipes 20. The feeding roller 13 is a roller member provided above in a direction vertical to the first can roller 15 so as to be capable of rotating about the axis. A long strip-shaped negative electrode current collector 3 is spirally wound around the surface of the feeding roller 13, and the feeding roller 13 supplies the negative electrode current collector 3 to the transfer roller 14 located closest to the feeding roller 13.

The transfer rollers 14 are roller members provided so as to be capable of rotating about the axis. The transfer rollers 14 guide the negative electrode current collector 3 supplied from the feeding roller 13 to the first can roller 15, the second can roller 16, and finally to the winding roller 17.

The first can roller 15 and the second can roller 16 are roller members provided so as to be capable of rotating about their respective axes, and include cooling means (not shown) in the inside thereof. As the cooling means, for example, a cooling apparatus that performs cooling by circulating cooling water, or the like, can be used. A negative electrode active material layer 2 is formed on a surface of the negative electrode current collector 3 while the negative electrode current collector 3 moves along the circumference of the first can roller 15 and the second can roller 16.

In addition, the first can roller 15 and the second can roller 16 are provided such that their axes are located in parallel to each other at the same position in the vertical direction, and that their circumferences are spaced apart from each other with a gap therebetween. The winding roller 17 is a roller member provided in a direction vertical to the second can roller 16 so as to be capable of being driven to rotate by a driving means (not shown), and winds the negative electrode current collector 3 in which thin films have been formed on both surfaces for storage.

The active material adding means 18 are container members that are provided vertically below the lowermost portion in the direction vertical to the first can roller 15 and the second can roller 16, and whose upper portion in the vertical direction is open. Inside the active material adding means 18, an alloy-based negative electrode active material is placed. A heating means (not shown) is provided in the vicinity of the active material adding means 18, and the alloy-based negative electrode active material within the active material adding means 18 is heated and evaporated by this heating means.

The vapor of the alloy-based negative electrode active material travels upward in the vertical direction, passes through openings 22 and 23, which will be described later, and arrives at the lowermost portion in the direction vertical to the first can roller 15 and the second can roller 16, where it attaches to the surface of the negative electrode current collector 3 and, thus, a thin film (negative electrode active material layer 2) made of a negative electrode active material primarily containing silicon or tin is formed. As the active material adding means 18, for example, crucibles can be used. As the heating means, for example, electron beam irradiation apparatuses or the like can be used.

In the present embodiment, the active material adding means 18 are disposed to be aligned almost linearly with the first can roller 15 and the second can roller 16 in the vertical direction, but the configuration is not limited thereto, and it is also possible to dispose the active material adding means 18 obliquely below in the direction vertical to the first can roller 15 and the second can roller 16. With this configuration, the active material is deposited obliquely, so a thin film having pores inside is formed.

A plurality of shielding plates 19 are provided spaced apart from each other with a gap therebetween at the same height in the vertical direction. The gaps formed in the horizontal direction between shielding plates 19 are openings 22 and 23. The shielding plates 19 are provided to cause the active material vapor released from the active material adding means 18 to come into contact with only the portions of the negative electrode current collector 3 corresponding to the openings 22 and 23.

The raw material gas introducing pipes 20 are pipe-like members that are each disposed with one end vertically above the active material adding means 18 and the other end connected to a raw material gas supply means (not shown) provided outside the vacuum chamber 12, and that supply oxygen, nitrogen or the like to the active material vapor. With this, a thin film primarily containing an oxide, nitride or oxynitride of the alloy-based negative electrode active material is formed on the negative electrode current collector 3 surface. Examples of raw material supply means include a compressed gas cylinder, a gas generation apparatus, etc. The air exhaust means 21 provided outside the vacuum chamber 12 brings the inside of the vacuum chamber 12 into a reduced pressure state suitable for making thin films. As the air exhaust means 21, for example, a pressure reducing pump or the like can be used.

With the film-forming apparatus 11, the negative electrode current collector 3 sent from the feeding roller 13 moves along the circumference of the first can roller 15 via the transfer roller 14, receives a supply of active material vapor and optionally oxygen, nitrogen or the like at the opening 22, and thereby a thin film (negative electrode active material layer 2) containing a negative electrode active material primarily containing silicon or tin is formed on one surface of the negative electrode current collector 3. The negative electrode current collector 3 is then reversed by other transfer rollers 14 to move along the circumference of the second can roller 16.

At this time, the surface having a thin film formed thereon is in contact with the circumference of the second can roller 16. The negative electrode current collector 3 receives a supply of active material vapor and optionally oxygen, nitrogen or the like at the opening 23 and, thereby, a thin film containing a negative electrode active material primarily containing silicon or tin is formed on the other surface of the negative electrode current collector 3. The negative electrode current collector 3 having thin films (negative electrode active material layers 2) formed on both surfaces thereof passes through another transfer roller 14, and is wound by the winding roller 17. In this manner, a negative electrode current collector 3 having negative electrode active material layers 2 formed on both surfaces thereof is obtained, and the thin film-forming step ends.

In the lithium adding step performed subsequent to the thin film-forming step, a thin lithium film is formed using a thin film-forming method on the negative electrode active material layer 2 surface of the negative electrode current collector 3 obtained in the thin film-forming step so as to produce a negative electrode 1 of the present invention. At this time, a thin lithium film is formed not only on the opposing portion 9 but also on the non-opposing portion 10 so as to add lithium. As the thin lithium film-forming method, any known method can be used and, for example, a direct addition method can be used. According to the direct addition method, lithium is added by forming a thin lithium film on the negative electrode active material layer 2 surface using an apparatus capable of forming thin lithium films by a vacuum process. Specific examples of vacuum processes include the above-mentioned vapor deposition thin film-forming methods. Among them, the vapor deposition method is preferable in particular.

Preferably, an appropriate thin lithium film-forming method is selected according to the amount of lithium added to the opposing portion 9 and the non-opposing portion 10 (hereinafter referred to simply as "lithium addition amount").

In the case where the lithium addition amount is almost the same for the opposing portion 9 and the non-opposing portion 10, it is preferable to employ the direct addition method. In the case where the lithium addition amount for the non-opposing portion 10 is larger than that for the opposing portion 9 as well, it is preferable to employ the direct addition method.

According to the direct addition method, because lithium is added to the negative electrode active material layer 2 by forming a thin lithium film, it is easy to adjust the lithium addition amount. For example, when continuously processing a long negative electrode current collector 3, by providing a mask to limit the application of a thin lithium film in which the dimensions of the openings for a non-opposing portion 10 are made larger than that for the opposing portion 9, lithium can be added to the opposing portion 9 and the non-opposing portion 10 at the desired ratio.

More specifically, a thin lithium film is formed on the negative electrode current collector 3 having negative electrode active material layers 2 obtained in the thin film-forming step, using a metal mask positioned at the thin film-forming position by a winding type continuous film-forming method. The metal mask has openings for supplying lithium vapor to the negative electrode active material layer 2 of the negative electrode current collector 3. The openings of the metal mask are provided extending in a direction orthogonal to the longitudinal direction of the negative electrode current collector 3 (hereinafter referred to as "width direction"). The openings of the metal mask are provided so as to be, for example, capable of being adjusted in the longitudinal direction of the negative electrode current collector. At this time, for example, by adjusting the opening length of the metal mask, lithium can be added to the opposing portion 9 and the non-opposing portion 10 of the negative electrode active material layer 2 in respective desired amounts.

For example, in the portions corresponding to both end portions in the width direction of the negative electrode current collector 3, the opening length of the openings of the metal mask is increased by approximately several millimeters relative to that for the portion corresponding to the center portion in the width direction of the negative electrode current collector 3. With this configuration, more lithium is added to both end portions in the width direction of the negative electrode current collector 3 than to the center portion nearly proportionally to the ratio of the opening length of the metal mask. The lithium amount added to both end portions may be increased stepwise from the center portion, or may be continuously increased gradually. Such adjustment can be performed by adjusting the opening shape and opening length of the metal mask.

A case will be discussed in which, for example, a lithium film with a thickness of 8 μm is formed on the opposing portion 9 and a lithium film with a thickness of 10 μm is formed in the non-opposing portion 10 by stepwise changing the mask shape (opening width) used when adding lithium. There is a slight distortion in the boundary between the opposing portion 9 (the portion to which a 8 μm thick layer has been added) and the non-opposing portion (the portion to which a 10 μm thick layer has been added) immediately after addition of lithium by the thin film-forming method, but the deformation in the boundary between the opposing portion 9 and the non-opposing portion 10 in the end portions in the width direction during charge/discharge becomes small. By how much the lithium addition amount of the non-opposing portion 10 is preferably increased relative to the lithium addition amount of the opposing portion 9 can be determined by actually producing negative electrodes with different lithium addition amounts and selecting an appropriate amount according to the deformation of the current collector after lithium is added and the deformation when charge and discharge are performed.

As described above, the effect of the present invention is exhibited not only when the lithium addition amount for opposing portion 9 exactly matches the irreversible capacity. That is, the effect of the present invention is obtained by mitigating an extreme difference in deformation that occurs between the opposing portion 9 and the non-opposing portion 10 between when lithium is applied and when charge and discharge are performed. Accordingly, needless to say, the effect of the present invention is exhibited even when the lithium addition amount slightly fluctuates relative to the amount equivalent to the irreversible capacity due to an error or human operation.

For example, when the negative electrode capacity is much larger than the positive electrode capacity, by intentionally adding lithium in an amount slightly larger than the irreversible capacity, it is possible to prevent battery capacity degradation due to variation in the negative electrode plate. Conversely, when the positive electrode capacity is much larger than the negative electrode capacity, a slightly smaller amount of lithium than the irreversible capacity can be applied intentionally.

After the addition of lithium, if the end portions in the width direction include a portion on which no thin film is formed, that portion is cut, and the current collector is cut to a prescribed length, and, thereby, a negative electrode 1 of the present invention can be obtained. The negative electrode 1 of the present invention is applicable to various types of lithium secondary batteries. Although there is no particular limitation on the battery shape and the sealing form, it is particularly effective when used in a secondary battery with a spirally wound design, a stacked design or the like.

Figure 4:
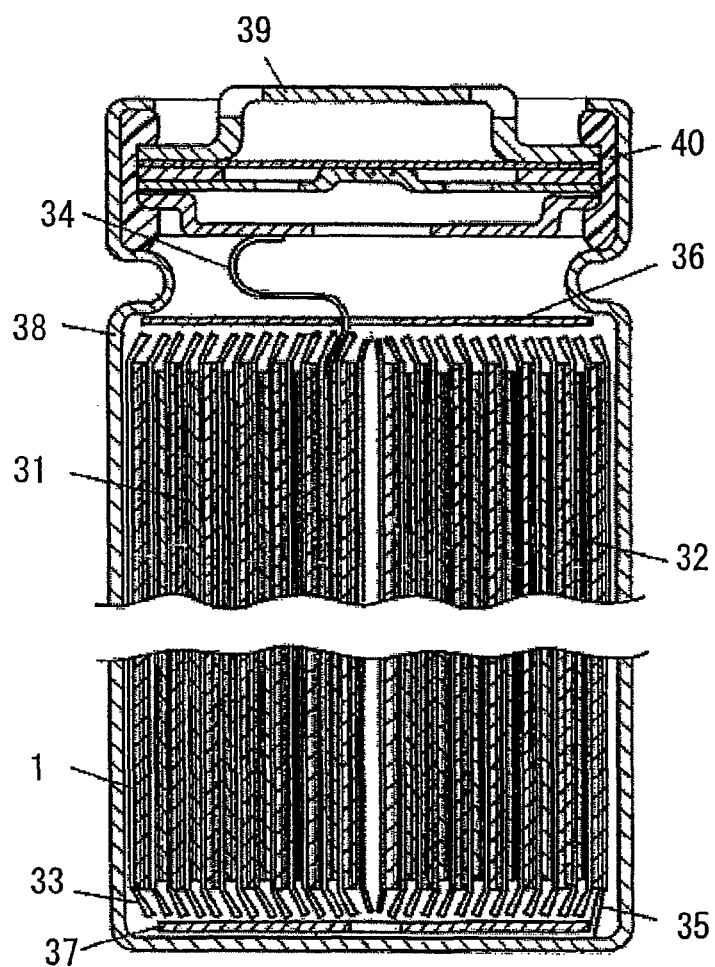
FIG. 4 is a vertical cross-sectional view schematically illustrating the configuration of a lithium ion secondary battery of the present invention.

FIG. 4 is a vertical cross-sectional view schematically illustrating the configuration of a lithium ion secondary battery 30 according to an embodiment of the present invention. A feature of the lithium ion secondary battery 30 is the inclusion of a negative electrode 1 of the present invention, and other constituents are the same as those of a conventional lithium ion secondary battery. The lithium ion secondary battery 30 is a spirally wound secondary battery including a spirally wound electrode group 31, a positive electrode lead 34, a negative electrode lead 35, an upper insulating ring 36, a lower insulating ring 37, a battery can 38, a sealing plate 39, and an insulating gasket 40.

The electrode group 31 includes a negative electrode 1, a positive electrode 32 and a separator 33, and is housed in the battery can 38. The negative electrode 1, the positive electrode 32 and the separator 33 are all strip-shaped, and by spirally winding the negative electrode 1 and the positive electrode 32 with the separator 33 interposed therebetween, the electrode group 31 is obtained.

The negative electrode 1 is the above-described negative electrode 1 for a lithium ion secondary battery of the present invention. In the negative electrode active material layer of the negative electrode 1, the non-opposing portion may be in both end portions in the longitudinal direction of the negative electrode 1, or may be located in a portion other than the end portions.

The positive electrode 32 includes a positive electrode current collector (not shown) and a positive electrode active material layer. The positive electrode active material layer is provided in contact with the positive electrode current collector, and the separator 33 is provided on the side of the positive electrode active material layer on which the positive electrode current collector is not provided. It is preferable that the positive electrode 32 is formed such that the width in the longitudinal direction is slightly smaller than the width in the longitudinal direction of the negative electrode 1. The purpose of this is to, as already stated above, prevent lithium from depositing on the current collector of the negative electrode 1 during charge, and the like.

The current collector can be any current collector widely used in the pertinent art. For example, a porous or poreless conductive substrate can be used. Examples of porous conductive substrates include mesh, net, punched sheet, lath structures, porous sheet, foam, articles made of fibers (nonwoven fabric, etc.), and the like. Examples of poreless conductive substrates include foil, sheet, film, and the like. Examples of materials for conductive substrates include metal materials such as stainless steel, titanium, aluminum and aluminum alloy. The thickness of the conductive substrate is, but is not limited to, for example, approximately 1 to 50 µm.

The positive electrode active material layer is provided on only one surface or both surfaces in the thickness direction of the positive electrode current collector, and contains a positive electrode active material. The positive electrode material mixture layer may further contain, in addition to the positive electrode active material, a conductive material, a binder, and the like.

As the positive electrode active material, commonly used positive electrode active materials capable of absorbing and desorbing lithium ions can be used. Among them, it is preferable to use a lithium-containing composite oxide. As the lithium-containing composite oxide, known lithium-containing composite oxides can be used. Examples include lithium nickel composite oxide such as $LiNiO_2$, lithium cobalt composite oxide such as $LiCoO_2$, and lithium manganese composite oxide such as spinel structured $LiMn_2O_4$. It is also possible to use a lithium-containing composite oxide in which some of the transition metals are substituted by another element, as the positive electrode active material. For example, it is also possible to use a composite oxide obtained by substituting some of the Ni elements of $LiNiO_2$ with Co or another element Mn, Ti, etc.).

As the conductive material, any conductive material widely used in the pertinent art can be used. Examples include: graphites such as natural graphite and artificial graphite; carbon blacks such as acetylene black, ketjen black, channel black, furnace black, lamp black and thermal black; conductive fibers such as carbon fiber and metal fiber; metal powders such as a carbon fluoride powder and an aluminum powder; conductive whiskers such as zinc oxide and potassium titanate; conductive metal oxides such as titanium oxide; and organic conductive materials such as phenylene derivatives. As the conductive material, they may be used alone or in a combination of two or more as appropriate.

Similarly, the binder can be any binder widely used in the pertinent art. Examples include polyvinylidene fluoride (PVDF), polytetrafluoroethylene, polyethylene, polypropylene, aramid resin, polyamide, polyimide, polyamide imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinyl pyrrolidone, polyether, polyether sulfone, hexafluoropolypropylene, styrene butadiene rubber, carboxymethyl cellulose, etc.

As the binder, it is also possible to use a copolymer containing two or more of the following monomer compounds. Examples of monomer compounds include tetrafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, hexadiene, etc. As the binder, they may be used alone or in a combination of two or more as appropriate.

The positive electrode active material layer can be formed by, for example, applying a positive electrode material mixture slurry onto the surface of a positive electrode core member, drying and drawing it. The positive electrode material mixture slurry can be prepared by dissolving or dispersing a positive electrode active material and optionally a conductive material, a binder and the like in an organic solvent. As the organic solvent, for example, dimethylformamide, dimethylacetamide, methylformamide, N-methyl-2-pyrrolidone (NMP), dimethylamine, acetone, cyclohexanone or the like can be used. There is no particular limitation on the thickness of the positive electrode active material layer, but it is preferable that, when the positive electrode active material layer is provided on both sides of a current collector, for example, the total thickness of the positive electrode active material layers is approximately 50 to 100 µm.

The separator 33 is provided on the side of the positive electrode active material layer on which the positive electrode current collector is not provided. More specifically, the separator 33 is provided interposed between the positive electrode 32 and the negative electrode 1. The width in the longitudinal direction of the separator 33 is configured to be longer than the widths in the longitudinal direction of the positive electrode 32 and the negative electrode 1. As the separator 33, it is possible to use a separator widely used in the pertinent art and, for example, a porous sheet made of a synthetic resin material can be used. There is no particular limitation on the synthetic resin material, but it is preferable to use a polyolefin such as polyethylene or polypropylene. Specific examples of the porous sheet include a porous film, woven fabric, non-woven fabric and the like. There is no particular limitation on the separator thickness, and it is possible to select from a range ranging from approximately 10 to 300 µm as appropriate, according to the form, application and the like of the lithium ion secondary battery.

In the electrode group 31, an electrolyte (not shown) is impregnated or carried. The electrolyte is preferably a non-aqueous electrolyte. As the non-aqueous electrolyte, for example, a liquid non-aqueous electrolyte, gel non-aqueous electrolyte, solid electrolyte (e.g., polymer solid electrolyte) or the like can be used.

The liquid non-aqueous electrolyte contains a solute (supporting salt) and a non-aqueous solvent, and optionally contains various additives. The solute ordinarily dissolves in the non-aqueous solvent. The liquid non-aqueous electrolyte is, for example, impregnated into the separator.

The solute can be any solute widely used in the pertinent art. Usable examples include $LiClO_4$, $LiBF_4$, $LiAlCl_4$, $LiSbF_6$, LiSCN, $LiCF_3SO_3$, $LiCF_3CO_2$, $LiAsF_6$, lithium lower aliphatic carboxylates, LiCl, LiBr, LiI, chloroboran lithium, borate, imide, etc.

Examples of borates include lithium bis(1,2-benzenediolate(2-)-O,O')borate, lithium bis(2,3-naphthalenediolate (2-)-O,O')borate, lithium bis(2,2'-biphenyldiolate(2-)-O,O') borate, lithium bis(5-fluoro-2-olate-1-benzene sulfonate-O, O')borate, etc.

Examples of imides include lithium bis(trifluoromethanesulfonyl)imide (($CF_3SO_2)_2NLi$), lithium (trifluoromethanesulfonyl)(nonafluorobutanesulfonyl)imide (($CF_3SO_2$) ($C_4F_9SO_2$)NLi), lithium bis(pentafluoroethane sulfonyl) imide (($C_2F_5SO_2)_2NLi$), etc.

As the solute, they may be used alone or in a combination of two or more as appropriate. It is desirable that the amount of solute dissolved in a non-aqueous solvent is within a range ranging from 0.5 to 2 mol/L.

The non-aqueous solvent can be any non-aqueous solvent widely used in the pertinent art. Examples include cyclic carbonic acid esters, chain carbonic acid esters, cyclic carboxylic acid esters, etc. Examples of cyclic carbonic acid esters include propylene carbonate (PC), ethylene carbonate (EC), butylene carbonate, etc. Examples of chain carbonic acid esters include diethyl carbonate (DEC), ethyl methyl carbonate (EMC), dimethyl carbonate (DMC), methyl propionate, etc. Examples of cyclic carboxylic acid esters include γ-butyrolactone (GBL), γ-valerolactone (GVL), etc. It is also possible to use non-aqueous solvents having an oxidation/reduction resistant potential at a level of around 4 V. As the non-aqueous solvent, they may be used alone or in a combination of two or more as appropriate.

Examples of additives include a material that can improve charge/discharge efficiency, a material that can make the battery inactive, etc. The material that can improve charge/discharge efficiency, for example, decomposes on the negative electrode and forms a coating having a high lithium ion conductivity to improve charge/discharge efficiency. Specific examples of such a material include vinylene carbonate (VC), 4-methylvinylene carbonate, 4,5-dimethylvinylene carbonate, 4-ethylvinylene carbonate, 4,5-diethyl vinylene carbonate, 4-propylvinylene carbonate, 4,5-dipropylvinylene carbonate, 4-phenyl vinylene carbonate, 4,5-diphenyl vinylene carbonate, vinylethylene carbonate (VEC), divinyl ethylene carbonate, etc. They may be used alone or in a combination of two or more. Among them, it is preferable to use at least one selected from vinylene carbonate, vinylethylene carbonate and divinyl ethylene carbonate. In the above compounds, some of the hydrogen atoms may be substituted by fluorine atoms.

The solid electrolyte contains a solute (supporting salt) and a polymer material. The solute can be any of those listed above. As the polymer material, for example, polyethylene oxide (PEO), polypropylene oxide (PPO), a copolymer of ethylene oxide and propylene oxide, or the like can be used.

One end of the positive electrode lead 34 is connected to the positive electrode 31, and the other end is connected to the sealing plate 39. The positive electrode lead 34 is made of, for example, aluminum. One end of the negative electrode lead 35 is connected to the negative electrode 1, and the other end is connected to the bottom of the battery can 38. The negative electrode lead 35 is made of, for example, copper, nickel or the like. The electrode group 32 is housed inside the battery can 38.

The upper insulating ring 36 is mounted on one end in the longitudinal direction of the electrode group 31. The lower insulating ring 37 is mounted on the other end in the longitudinal direction of the electrode group 32, and insulates the electrode group 31 and the bottom of the battery can 38 from each other. The sealing plate 39 is provided such that it closes the upper opening of the battery can 38 so as to seal the battery can 38. The insulating gasket 40 is provided in the periphery portion of the sealing plate 39 so as to help the sealing plate 39 to seal the battery can 38. The insulating gasket 40 is made of, for example, polypropylene or the like.

Figure 5:
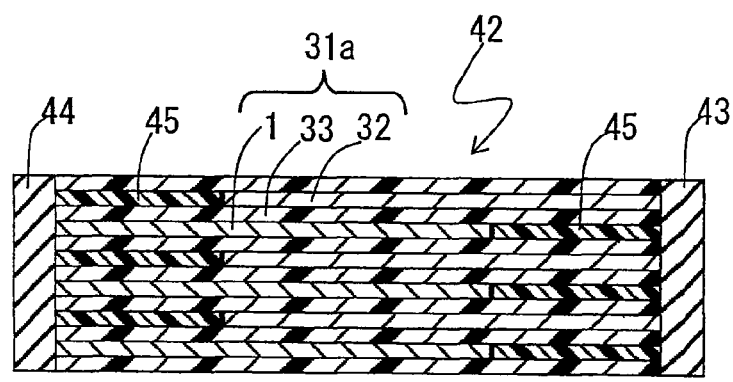
FIG. 5 is a vertical cross-sectional view schematically illustrating the configuration of a lithium ion secondary battery of the present invention.

FIG. 5 is a vertical cross-sectional view schematically illustrating the configuration of a lithium ion secondary battery 41 according to another embodiment of the present invention. Because the lithium ion secondary battery 41 is analogous to the lithium ion secondary battery 30, the same reference numerals are assigned to the corresponding parts, and descriptions thereof are omitted here. A feature of the lithium ion secondary battery 41 is that it is a stacked battery in the form of a sheet that includes an electrode group 42 that includes a negative electrode 1. The effect of the present invention is obtained even in stacked batteries. The lithium ion secondary battery 41 includes an electrode group 42, an external positive electrode 43, an external negative electrode 44, and an insulator 45.

The electrode group 42 is a laminated electrode group in which a plurality of unit electrode groups 31a and a plurality of separators 33 are alternately laminated. The unit electrode groups 31a are each an electrode group in which one negative electrode 1 and one positive electrode 32 are laminated with one separator 33 interposed therebetween. The negative electrode 1 has a negative electrode active material layer including a opposing portion opposing the positive electrode active material layer of the positive electrode 32 and a non-opposing portion not opposing the positive electrode active material layer of the positive electrode 32. The opposing portion and the non-opposing portion contain a prescribed amount of lithium as already described above.

The external positive electrode 43 is a metallic member, and is electrically connected to the positive electrode 32 of the electrode group 42. The external negative electrode 44 also is a metallic member, and is electrically connected to the negative electrode 1 of the electrode group 42. The insulator 45 is an insulating member made of a synthetic resin or the like, and is disposed on both end portions in a direction orthogonal to the thickness direction of the electrode group 42. The insulator 45 on the external positive electrode 43 side end portion is disposed between the negative electrode 1 and the external positive electrode 43, and insulates the negative electrode 1 and the external positive electrode 43 from each other. The insulator 45 on the external negative electrode 44 side end portion is disposed between the positive electrode 32 and the external negative electrode 44, and insulates the positive electrode 32 and the external negative electrode 44 from each other.

EXAMPLES

Hereinafter, the present invention will be described in detail with reference to examples and comparative examples. It should be understood, however, that the present invention is not limited to the examples given below.

Example 1

A negative electrode for a lithium ion secondary battery and a lithium ion secondary battery according to the present invention were produced.
(Production of Negative Electrode)
(1) Formation of Thin Silicon Film A roll of surface-roughened copper foil (negative electrode current collector 3, thickness: 35 μm, width: 80 mm, available from Furukawa Circuit Foil Co., Ltd.) was loaded into the winding roller 13 of the film-forming apparatus 11 shown in FIG. 3. A 270-degree deflection electron beam evaporation source (available from JEOL Ltd.) was used as an active material adding means 18. Silicon as an active material was irradiated with an electron beam with an accelerating voltage of −10 kV and an emission current of 500 mA, and the film forming rate was set to 120 nm/sec.

The first can roller 15 and the second can roller 16 were cooled with cooling water at 10° C. by a cooling water circulation cooling apparatus. A metal mask having an opening length of 20 cm was provided in the vicinity of the underside in the direction vertical to the first can roller 15 and the second can roller 16, and the width of the formed film (the width in a direction orthogonal to the longitudinal direction of the surface-roughened copper foil) was set to 60 mm.

The vacuum chamber 12 was evacuated to 0.002 Pa, and then the degree of the vacuum in the vacuum chamber 12 was adjusted to 0.003 Pa. The surface-roughened copper foil was fed to the first can roller 15 and the second can roller 16 at a feed rate of 0.36 m/min, and a 4 μm thick, thin silicon film was formed on each surface of the surface-roughened copper foil at the regions constituting the openings 22 and 23. No raw material gas was introduced. Likewise, a surface-roughened copper foil having a 4 μm thick, thin silicon film formed on only one surface was produced by closing the opening portion of the metal mask corresponding to the second can roller 16.

(2) Addition of Lithium

The above-obtained surface-roughened copper foil having a thin silicon film with a thickness of 4 μm and a width of 60 mm formed on only one surface was cut into a 12 mm diameter piece, and a coin battery was assembled using a lithium counter electrode. This coin battery was subjected to a charge/discharge test with constant current charge/discharge at 0.2 C (1 C is one hour rate current), and the charge capacity and the discharge capacity in the initial charge/discharge cycle were measured. The charge capacity was equivalent to a lithium thickness of 20 μm. From the results obtained from measurement, the irreversible capacity was calculated using the following equation, and found to be about 6%, from which it was found that it was necessary to add lithium in an amount equivalent to a lithium thickness of 1.2 μm.

$$\text{Irreversible Capacity (\%)}=(\text{Charge Capacity}-\text{Discharge Capacity})/\text{Charge Capacity}\times 100$$

A roll of the surface-roughened copper foil having 4 μm thick, thin silicon films formed on both surfaces was loaded onto the winding roller 13 of the film-forming apparatus 11 shown in FIG. 3. A resistance heating evaporation source was used as an active material adding means 18. Lithium as a vapor source was heated by a heater, and the application rate of lithium vapor was set to 80 nm/sec. The first can roller 15 and the second can roller 16 were cooled with cooling water at 10° C. by a cooling water circulation cooling apparatus. A metal mask having an opening length of 20 cm was provided in the vicinity of the underside in the direction vertical to the first can roller 15 and the second can roller 16, and the width of the formed film was set to 60 mm.

The vacuum chamber 12 was evacuated to 0.001 Pa, and then the degree of vacuum in the vacuum chamber 12 was adjusted to 0.002 Pa. The surface-roughened copper foil having 4 μm thick, thin silicon films formed on both surfaces was fed to the first can roller 15 and the second can roller 16 at a feed rate of 0.8 m/min, and a thin lithium film having a thickness of 1.2 μm and a width of 60 mm was formed on the surface of respective thin silicon films having a width of 60 mm formed on both surfaces of the surface-roughened copper foil at the regions constituting the openings 22 and 23, without introducing a raw material gas. After that, the copper foil was cut at both ends in the width direction in which no thin silicon film was formed, and then cut into a 900 mm long piece. Thus, a negative electrode of the present invention was produced.

(Production of Positive Electrode)

A mixture of $Li_2CO_3$ and $CoCO_3$ mixed at a prescribed molar ratio was heated at 950° C. to prepare $LiCoO_2$ as an active material, and the obtained active material was sized to a particle size of 45 μm or less to obtain a positive electrode active material. The positive electrode active material in an amount of 100 parts by weight was sufficiently mixed with 5 parts by weight of acetylene black (conductive material), 4 parts by weight of polyvinylidene fluoride (binder) and an appropriate amount of N-methyl-2-pyrrolidone (dispersing medium) to prepare a positive electrode material mixture paste. The positive electrode material mixture paste was applied to both surfaces of a 15 μm thick aluminum foil (current collector, available from Showa Denko K.K), dried and rolled and, thereby, 35 μm thick positive electrode active material layers were formed on both surfaces of the current collector. The current collector was cut to have a width of 56 mm and a length of 900 mm and, thereby, a positive electrode was produced.

(Assembly of Battery)

An end of a positive electrode lead made of aluminum was welded to the positive electrode current collector. An end of a negative electrode lead made of nickel was welded to the negative electrode current collector. The positive electrode, a microporous film (separator) made of polyethylene resin having a width of 62 mm, a length of 910 mm and a thickness of 20 μm, and the negative electrode were laminated in this order and spirally wound and, thereby, an electrode group was produced. This electrode group was placed in a dry atmosphere with a dew point of −60° C., and vacuum-dried at 60° C. for 10 hours to remove moisture from the electrode group. After that, insulating rings were attached to both ends in the longitudinal direction of the electrode group, and then the electrode group was housed in a battery can.

Subsequently, a non-aqueous electrolyte was injected into the battery can to impregnate the electrode group with the electrolyte. As the non-aqueous electrolyte, an electrolyte obtained by dissolving lithium hexafluorophosphate at a concentration of 1 mol/L in a solvent mixture of ethylene carbonate and diethyl carbonate at a volume ratio of 1:1 was used. The other end of the positive electrode lead was welded to the undersurface of the positive electrode terminal at the center of the insulating sealing plate. The other end of the negative electrode lead was welded to the inner bottom surface of the battery can. Finally, the opening of the battery can was closed with a sealing plate and, thereby, a cylindrical lithium ion secondary battery of the present invention was produced.

Example 2

A cylindrical lithium ion secondary battery of the present invention was produced in the same manner as in Example 1, except that a negative electrode of the present invention obtained in the following manner was used.

(Production of Negative Electrode)

(1) Formation of Thin Silicon Oxide Film

A roll of surface-roughened copper foil (negative electrode current collector 3, thickness: 12 μm, width: 80 mm, available from Furukawa Circuit Foil Co., Ltd.) was loaded onto the winding roller 13 of the film-forming apparatus 11 shown in FIG. 3. A 270-degree deflection electron beam evaporation source (available from JEOL Ltd.) was used as an active material adding means 18. Silicon as an active material was irradiated with an electron beam with an accelerating voltage of −10 kV and an emission current of 450 mA, and the film forming rate was set to 100 nm/sec.

The first can roller 15 and the second can roller 16 were cooled with cooling water at 10° C. by a cooling water circulation cooling apparatus. A metal mask having an opening length of 20 cm was provided in the vicinity of the underside in the direction vertical to the first can roller 15 and the second can roller 16, and the width of the formed film was set to 60 mm.

The vacuum chamber 12 was evacuated to 0.002 Pa, and then the degree of vacuum in the vacuum chamber 12 was adjusted to 0.04 Pa. The surface-roughened copper foil was fed to the first can roller 15 and the second can roller 16 at a feed rate of 0.1 m/min while introducing oxygen gas at 30 sccm at the regions constituting the openings 22 and 23, and, thereby, 12 μm thick, thin silicon oxide films were formed on both surfaces of the surface-roughened copper foil.

(2) Addition of Lithium

The above-obtained surface-roughened copper foil having thin silicon oxide films with a width of 60 mm and a thickness of 12 μm formed on both surfaces was cut to prescribed dimensions, and a coin battery was assembled using a lithium counter electrode. This coin battery was subjected to a charge/discharge test with constant current charge/discharge at 0.2 C (1 C is one hour rate current), and the charge capacity and the discharge capacity in the initial charge/discharge cycle were measured. The charge capacity was equivalent to a lithium thickness of 20 μm. From the results obtained from measurement, the irreversible capacity was calculated using the following equation, and found to be about 40%, from which it was found that it was necessary to add lithium in an amount equivalent to a lithium thickness of 8 μm.

Irreversible Capacity (%)=(Charge Capacity−Discharge Capacity)/Charge Capacity×100

A thin lithium film having a thickness of 8 μm and a width of 60 mm was formed on the surface of the thin silicon oxide film having a width of 60 mm formed on each surface of the surface-roughened copper foil in the same manner as in Example 1, except that the surface-roughened copper foil having 12 μm thick, thin silicon oxide films formed on both surfaces was fed at a feed rate of 0.12 m/min instead of 0.8 m/min. After that, the copper foil was cut at both ends in the width direction in which no thin silicon film was formed, and then cut into a 900 mm long piece. Thus, a negative electrode of the present invention was produced.

Comparative Example 1

A 4 μm thick, thin silicon film was formed on each surface of a surface-roughened copper foil (current collector, thickness: 35 μm, width: 80 mm, available from Furukawa Circuit Foil Co., Ltd.) in the same manner as in Example 1. Lithium was added to the thin silicon films in an amount equivalent to the irreversible capacity. The addition of lithium was performed in the same manner as in Example 1, except that the width of the formed thin lithium film was changed from 60 mm to 50 mm.

A thin lithium film was formed such that 25 mm wide portions extended from the center line in the width direction of the surface-roughened copper foil toward the end portions in the width direction. The width of the formed film was changed by adjusting the opening width of the metal mask. After that, the copper foil was cut at both ends in the width direction in which no thin silicon film was formed, and then cut into a 900 mm long piece. Thus, a negative electrode was produced. A cylindrical lithium ion secondary battery was produced in the same manner as in Example 1, except that the above negative electrode was used.

Comparative Example 2

A 12 μm thick, thin silicon oxide film was formed on each surface of a surface-roughened copper foil (current collector, thickness: 12 μm, width: 80 mm, available from Furukawa Circuit Foil Co., Ltd.) in the same manner as in Example 2. Lithium was added to the thin silicon oxide films in an amount equivalent to the irreversible capacity. The addition of lithium was performed in the same manner as in Example 2, except that the width of the formed thin lithium film was changed from 60 mm to 50 mm.

A thin lithium film was formed such that 25 mm wide portions extended from the center line in the width direction of the surface-roughened copper foil toward the end portions in the width direction. The width of the formed film was changed by adjusting the opening width of the metal mask. After that, the copper foil was cut at both ends in the width direction in which no thin silicon film was formed, and then cut into a 900 mm long piece. Thus, a negative electrode was produced. A cylindrical lithium ion secondary battery was produced in the same manner as in Example 1, except that the above negative electrode was used.

Test Example 1

The cylindrical lithium ion secondary batteries of Examples 1 and 2 and Comparative Examples 1 and 2 were subjected to a charge/discharge cycle test. As the charge/discharge cycle test, each battery was cycled 200 times in a constant temperature chamber set at 20° C., with one cycle comprised of the following constant current charge, constant voltage charge and discharge.

Constant current charge: Charge was performed at a charge current of 1 C (1 C is one hour rate current) until the battery voltage reached 4.05 V Constant voltage charge: Charge was performed at 4.05 V until the current value reached 0.05 C Discharge: Discharge was performed at a current of 1 C until the battery voltage reached 2.5 V After the cycle test, the battery was disassembled to check for deformation in the periphery of the end portions in the width direction of the negative electrode. In addition, in the cycle test, the ratio of discharge capacity at the 200th cycle to discharge capacity at the second cycle was determined as a percentage, which was defined as the capacity retention ratio (%). The closer to 100% the capacity retention ratio is, the better the cycle life is. The results are shown in Table 1.

TABLE 1

|  | Deformation of End Portion in Width Direction of Negative Electrode | Capacity Retention Ratio (%) |
| --- | --- | --- |
| Ex. 1 | Corrugated deformation | 78 |
| Ex. 2 | No deformation | 84 |
| Comp. Ex. 1 | Partial breakage | 70 |
| Comp. Ex. 2 | Corrugated deformation•Partial breakage | 76 |

After the above cycle test, the battery (discharged state) was disassembled to analyze the amount of lithium contained in the non-opposing portion not opposing the positive electrode disposed on both end portions in the width direction of the negative electrode by ICP emission spectroscopy. Considering winding slippage or the like of the battery, analysis was performed on the outermost 4 mm portion from each end of the 5 mm non-opposing portions not opposing the positive electrode that were formed on both ends in the width direction of the negative electrode. As a result, the amount of lithium contained in that region was almost the same as before charge/discharge.

It was found that, in Examples 1 and 2, the amount of lithium in the non-opposing portion not opposing the positive electrode after the test was almost equivalent to the irreversible capacity of the negative electrode active material thin film (thin film before addition of lithium). Specifically, the amount of lithium in the non-opposing portion not opposing the positive electrode of the negative electrode of Example 1 was equivalent to a lithium film thickness of 1.2 µm, and the amount of lithium in the non-opposing portion not opposing the positive electrode of the negative electrode of Example 2 was equivalent to a lithium film thickness of 8 µm. In contrast, in Comparative Examples 1 and 2, the amount of lithium in the non-opposing portion not opposing the positive electrode of the negative electrodes was almost 0, which was equivalent to at least a lithium film thickness of 0.1 µm or less.

Likewise, the amount of lithium in the positive electrode-opposing portion of the negative electrode after the cycle test was checked. As a result, in Example 1 and Comparative Example 1, the amount of lithium in the opposing portion was equivalent to a lithium film thickness of 1.2 µm, and in Example 2 and Comparative Example 2, the amount of lithium in the opposing portion was equivalent to a lithium film thickness of 8 µm.

It can be seen from Table 1 that, in Examples 1 and 2 in which lithium was added also to the non-opposing portion not opposing the positive electrode of the negative electrode, the periphery of both end portions in the width direction of the negative electrode after the cycle test was less deformed, and the capacity retention ratio was also high. This is presumably because the addition of lithium to the whole negative electrode plate causes the whole negative electrode to expand to some extent. Due to the expansion of the whole negative electrode, the difference in volume change between the opposing portion opposing the positive electrode and the non-opposing portion not opposing the positive electrode of the negative electrode during charge can be made smaller than that in the case in which lithium is added only to the opposing portion opposing the positive electrode. In addition, when the amount of lithium added to the non-opposing portion not opposing the positive electrode is further increased, the effect of the present invention in reducing the difference in volume change is further pronounced.

INDUSTRIAL APPLICABILITY

The negative electrode used in the present invention employs a negative electrode active material primarily containing silicon or tin, and is intended to reduce not only the deformation of the current collector but also the deformation of the electrode itself that occur due to charge and discharge. Accordingly, battery reliability can be improved by using the negative electrode. Furthermore, the lithium secondary battery of the present invention that includes this negative electrode has a high capacity, and the degradation of battery characteristics, such as cycle characteristics, accompanied by the deformation of the negative electrode current collector or the negative electrode is very small. Accordingly, the battery of the present invention is suitable for use as a power source for various electronic and electrical devices, and is useful as a power source for portable electronic devices in particular.

The invention claimed is:

1. A lithium ion secondary battery comprising:
a positive electrode current collector;
a positive electrode active material layer that is provided in contact with said positive electrode current collector;
a separator layer that is provided on a side of said positive electrode active material layer on which said positive electrode current collector is not provided;
a negative electrode active material layer that comprises silicon or tin, is provided on a side of said separator layer on which said positive electrode active material layer is not provided and a portion of the negative electrode material layer facing said separator layer includes an opposing portion opposing said positive electrode active material layer and a non-opposing portion not opposing said positive electrode active material layer, said opposing portion and said non-opposing portion containing lithium; and
a negative electrode current collector that is provided on a side of said negative electrode active material layer on which said separator layer is not provided,
wherein an amount of lithium contained in said non-opposing portion is about the same or larger than an amount of lithium contained in said opposing portion in a discharged state.

2. The lithium ion secondary battery in accordance with claim 1, wherein said lithium is inserted into said opposing portion and said non-opposing portion by forming a lithium film on the surfaces of said opposing portion and said non-opposing portion by a vacuum process before said battery is assembled.

3. The lithium ion secondary battery in accordance with claim 1, wherein said negative electrode active material layer is formed by a vacuum process.

4. The lithium ion secondary battery in accordance with claim 1, wherein the amount of lithium contained in said non-opposing portion and the amount of lithium contained in said opposing portion are the same or almost the same.

5. The lithium ion secondary battery in accordance with claim 1, wherein said positive electrode current collector, said positive electrode active material layer, said separator layer, said negative electrode active material layer, and said negative electrode current collector are spirally wound to form a spirally wound electrode, or said positive electrode current collector, said positive electrode active material layer, said separator layer, said negative electrode active material layer, and said negative electrode current collector are laminated to form a stacked electrode.

6. The lithium ion secondary battery in accordance with claim 1, wherein said lithium is diffused into said opposing portion and said non-opposing portion by a thin film-forming method.

7. A lithium ion secondary battery comprising:
a positive electrode current collector;
a positive electrode active material layer that is provided in contact with said positive electrode current collector;
a separator layer that is provided on a side of said positive electrode active material layer on which said positive electrode current collector is not provided;
a negative electrode active material layer that is provided on a side of said separator layer on which said positive electrode active material layer is not provided, that comprises silicon or tin, and that includes a opposing portion opposing said positive electrode active material layer and a non-opposing portion not opposing said positive electrode active material layer, said opposing portion and said non-opposing portion being diffused with lithium; and
a negative electrode current collector that is provided on a side of said negative electrode active material layer on which said separator layer is not provided,
wherein an amount of lithium per unit area added to the non-opposing portion is larger than an amount of lithium per unit area added to the opposing portion in a discharged state.

8. A lithium ion secondary battery comprising:
a positive electrode current collector;
a positive electrode active material layer that is provided in contact with said positive electrode current collector;
a separator layer that is provided on a side of said positive electrode active material layer on which said positive electrode current collector is not provided;
a negative electrode active material layer that is provided on a side of said separator layer on which said positive electrode active material layer is not provided, that comprises silicon or tin, and that includes a opposing portion opposing said positive electrode active material layer and a non-opposing portion not opposing said positive electrode active material layer, said opposing portion and said non-opposing portion being diffused with lithium; and
a negative electrode current collector that is provided on a side of said negative electrode active material layer on which said separator layer is not provided, wherein:
an amount of lithium added to the opposing portion is an amount equivalent to an irreversible capacity, and
an amount of lithium added to the non-opposing portion is selected from a range ranging from an amount greater than the amount equivalent to the irreversible capacity to less than an amount equal to a full charge.

* * * * *